US008338355B2

(12) United States Patent
Ishihara et al.

(10) Patent No.: US 8,338,355 B2
(45) Date of Patent: Dec. 25, 2012

(54) AZEOTROPE OR AZEOTROPE-LIKE COMPOSITION COMPRISING 1,1,2,2-TETRAFLUORO-1-METHOXYETHANE

(75) Inventors: Akira Ishihara, Kawagoe (JP); Yasuo Hibino, Shiki (JP)

(73) Assignee: Central Glass Company, Limited, Ube-shi (JP)

( * ) Notice: Subject to any disclaimer, the term of this patent is extended or adjusted under 35 U.S.C. 154(b) by 309 days.

(21) Appl. No.: 12/513,119

(22) PCT Filed: Oct. 2, 2007

(86) PCT No.: PCT/JP2007/069235

§ 371 (c)(1), (2), (4) Date: Apr. 30, 2009

(87) PCT Pub. No.: WO2008/053656

PCT Pub. Date: May 8, 2008

(65) Prior Publication Data

US 2010/0004155 A1 Jan. 7, 2010

(30) Foreign Application Priority Data

Nov. 1, 2006 (JP) ................................. 2006-298025
Sep. 28, 2007 (JP) ................................. 2007-252906

(51) Int. Cl.

| | |
|---|---|
| ***C11D 17/08*** | (2006.01) |
| ***C11D 17/00*** | (2006.01) |
| ***C08G 18/00*** | (2006.01) |
| ***C09K 21/00*** | (2006.01) |
| ***C09K 5/00*** | (2006.01) |
| ***C09K 5/04*** | (2006.01) |
| ***B01F 1/00*** | (2006.01) |
| ***C23G 5/00*** | (2006.01) |

(52) U.S. Cl. ........ 510/411; 510/407; 510/408; 510/415; 521/155; 521/170; 252/67; 252/364; 252/601

(58) Field of Classification Search .................. 252/500, 252/67, 364, 601; 510/407, 408, 411, 415; 521/155, 170
See application file for complete search history.

(56) References Cited

U.S. PATENT DOCUMENTS

| | | | | |
|---|---|---|---|---|
| 5,137,932 | A * | 8/1992 | Behme et al. | 521/131 |
| 6,699,829 | B2 | 3/2004 | Doyel et al. | |
| 7,288,511 | B2 | 10/2007 | Doyel et al. | |
| 2006/0166851 | A1* | 7/2006 | Grzyll et al. | 510/407 |
| 2006/0237683 | A1* | 10/2006 | Nappa et al. | 252/67 |
| 2006/0266976 | A1* | 11/2006 | Minor et al. | 252/68 |
| 2008/0199408 | A1* | 8/2008 | Poss et al. | 424/40 |

FOREIGN PATENT DOCUMENTS

| | | | |
|---|---|---|---|
| JP | 5-271692 | A | 10/1993 |
| JP | 11-279097 | | 10/1999 |
| JP | 11-279098 | A | 10/1999 |
| JP | 2000-143568 | A | 5/2000 |
| JP | 2000-192090 | A | 7/2000 |
| JP | 2003-277458 | A | 10/2003 |
| JP | 2005-23259 | A | 1/2005 |
| JP | 2005-523991 | A | 8/2005 |
| JP | 2005-307062 | A | 11/2005 |
| JP | 2006-117811 | A | 5/2006 |

OTHER PUBLICATIONS

International Search Report dated Jan. 8, 2008 w/PCT/ISA/237 (Nine (9) pages).

* cited by examiner

*Primary Examiner* — Harold Pyon
*Assistant Examiner* — Tanisha Diggs
(74) *Attorney, Agent, or Firm* — Crowell & Moring LLP

(57) ABSTRACT

There is provided an azeotrope or azeotrope-like composition containing (A) 1,1,2,2-tetrafluoro-1-methoxyethane and (B) a compound formed of at least one selected from the group consisting of (Z)-1-chloro-3,3,3-trifluoropropene, 2-bromo-3,3,3-trifluoropropene, and (E)-2-bromo-1,3,3,3-tetrafluoro-propene.

8 Claims, 2 Drawing Sheets

AZEOTROPE OR AZEOTROPE-LIKE COMPOSITION COMPRISING 1,1,2,2-TETRAFLUORO-1-METHOXYETHANE

This is an application filed under 35 U.S.C. 371 of PCT/JP2007/069235, filed Oct. 2, 2007, which claims priority from JP 2006-298025, filed Nov. 1, 2006 and JP 2007-252906, filed Sep. 28, 2007.

TECHNICAL FIELD

The present invention relates to an azeotrope or azeotrope-like composition containing 1,1,2,2-tetrafluoro-1-methoxyethane.

BACKGROUND OF THE INVENTION

Hitherto, chlorofluorinated saturated hydrocarbons have been used for refrigerant, foaming agent, etc. by using specifically trichlorofluoroethane (CFC-11), dichlorodifluoromethane (CFC-12), 1,1,2-trichloro-1,2,2-trifluoroethane (CFC-113), 1,1-dichloro-1-fluoroethane (HCFC-141b), 1,1,1-trichloroethane, etc. Since these substances also contain chlorine, there has been a concern that they destroy the ozone layer. Therefore, there has been a development of substances as alternatives to chlorofluorinated saturated hydrocarbons, and fluorine-containing saturated hydrocarbons are used, such as difluoromethane (HFC-32), 1,1,2-trifluoroethane (HFC-134a), 1,1,1,3,3-pentafluoropropane (HFC-245fa), or 1,1,1,3,3-pentafluorobutane (HFC-365mfc), etc.

As conventional techniques using these compounds, patents relating to an azeotrope or azeotrope-like composition with 1,1,2,2-tetrafluoro-1-methoxyethane (HFE-254pc) are disclosed in Patent Publication 1 and Patent Publication 2. Furthermore, a mixed foaming agent between 1,1,2,2-tetrafluoro-1-methoxyethane and a nonflammable hydrofluorocarbon or fluorinated ether is described in Patent Publications 3, 4 and 5.

Furthermore, as a conventional technique related to the present invention, a cleaning composition containing dichloroethylene and a six carbon alkoxy substituted perfluoro compound is described in Patent Publication 6.

On the other hand, azeotrope and azeotrope-like compositions, refrigerant, foaming agent, cleaning agent, water-repellent drying solvent, etc., centering on halogenated hydrocarbons, are widely used for cleaning in various industrial fields. Since they are highly soluble in oily substances such as oils and fats, they are applied to cleaning solvent, finishing cleaning agent of precision parts, etc.

As conventional techniques of these, Patent Publication 7 discloses a perfluorobutyl methyl ether-containing azeotrope-like composition containing perfluorobutyl methyl ether, a bromine-containing hydrocarbon and a lower alcohol, and a cleaning agent, and Patent Publication 8 discloses a cleaning composition containing perfluorobutyl alkyl ether, n-heptane and diethylene glycol as essential components, and a cleaning method.

Patent Publication 1: Japanese Patent Application Publication 11-279097
Patent Publication 2: Japanese Patent Application Publication 11-279098
Patent Publication 3: Japanese Patent Application Publication 2003-277458
Patent Publication 4: Japanese Patent Application Publication 2005-023259
Patent Publication 5: Japanese Patent Application Publication 2005-307062
Patent Publication 6: Japanese Patent Application Publication 2005-523991
Patent Publication 7: Japanese Patent Application Publication 2000-143568
Patent Publication 8: Japanese Patent Application Publication 2000-192090

SUMMARY OF THE INVENTION 1,1,2,2-tetrafluoro-1-methoxyethane, which is described in Patent Publication 1 and Patent Publication 2, does almost not show toxicity to human body and is superior in solubility in various organic matters and thermally stable. Since it does not contain chlorine in the molecule, it is one that does not destroy the ozone layer, and global warming potential ($GWP_{100}$) is as small as 30.

However, this fluorine-containing saturated hydrocarbon had some difficulties. For example, although 1,1,2,2-tetrafluoro-1-methoxyethane has a boiling point of 37.2° C., it has a flash point and is a flammable substance. Therefore, the use in a working spot disliking flammability is very difficult. According to the methods described in Patent Publications 3, 4 and 5, substances contained in azeotrope or azeotrope-like compositions are relatively large in GWP and problematic in terms of global environment, too.

Furthermore, although Patent Publication 5 uses a fluorocarbon and a fluoroether that are low in GWP, the present condition is that they still have high prices as compared with conventional chlorine-series saturated hydrocarbons.

On the other hand, there have been difficulties hitherto in terms of the use as refrigerant, foaming agent, cleaning agent, aerosol, or water-repellent drying solvent. For example, a cleaning agent using a composition described in Patent Publication 7 or 8 is useful, since it is relatively low in GWP and is one that does not destroy the ozone layer. However, perfluoroalkylethers have relatively high prices, and a brominated saturated hydrocarbon that is high in toxicity and a flammable alcohol are used, and so on. Thus, there have been problems in industrial uses.

Thus, there have been a demand to provide novel compositions that have superior characteristics such as low toxicity, a small global warming potential and a small greenhouse effect, and a demand to provide a refrigerant, foaming agent, cleaning agent, aerosol or water-repellent drying solvent that is superior in cleaning characteristics.

As a result of an eager study by the present inventors to solve the above task, we have obtained findings that a combination of 1,1,2,2-tetrafluoro-1-methoxyethane represented by formula [1]

[Chemical Formula 1]

$$CHF_2CF_2OCH_3 \quad [1]$$

and at least one selected from the group consisting of (Z)-1-chloro-3,3,3-trifluoropropene, 2-bromo-3,3,3-trifluoropropene, and (E)-2-bromo-1,3,3,3-tetrafluoropropene forms an azeotrope or azeotrope-like composition at a particular ratio, and that this composition is superior in drying property and stain removal property and is extremely useful as a foaming agent or cleaning agent that is superior in cleaning characteristics, thereby reaching solution of the above task.

It was found that the composition of the present invention has a lowering of boiling point under normal pressure (0.101 MPa, absolute pressure, it is the same hereinafter), and it was confirmed to be in an azeotrope condition.

Furthermore, we have obtained findings that a composition containing 1,1,2,2-tetrafluoro-1-methoxyethane, when combined with each of (Z)-1-chloro-3,3,3-trifluoropropene, 2-bromo-3,3,3-trifluoropropene and (E)-2-bromo-1,3,3,3-tetrafluoropropene at a particular ratio, shows an azeotrope or azeotrope-like condition, thereby making it possible to provide a stable cleaning capability at all times.

Since fluorine-containing unsaturated hydrocarbons, such as (Z)-1-chloro-3,3,3-trifluoropropene, 2-bromo-3,3,3-trifluoropropene and (E)-2-bromo-1,3,3,3-tetrafluoropropene, are high in cleaning capability by themselves and are nonflammable compounds, they are easy in handling and are very useful. They, however, have chlorine atom or bromine atom, and therefore there have been concerns in toxicity and chemical stability, and a difficulty in industrial use.

On the other hand, HFE series compounds, such as 1,1,2,2-tetrafluoro-1-methoxyethane, are flammable substances. Since they do not have chlorine atom in the compounds, they have not been so high in cleaning capability as compared with fluorine-containing unsaturated hydrocarbons.

In the present invention, it was possible to obtain a cleaning agent that is small in concern about toxicity and chemical stability, has nonflammable property, and is superior in cleaning capability by mixing 1,1,2,2-tetrafluoro-1-methoxyethane with at least one selected from the group consisting of (Z)-1-chloro-3,3,3-trifluoropropene, 2-bromo-3,3,3-trifluoropropene, and (E)-2-bromo-1,3,3,3-tetrafluoropropene.

Vapor pressure increases than a single component does, and it is possible to improve drying performance as compared with the case of a single component. Even if the composition is repeatedly subjected to vaporization and condensation, compositional change of the composition does not occur, and it is possible to maintain an extremely stable performance. Furthermore, the azeotrope or azeotrope-like composition of the present invention is relatively high in flash point, and therefore is extremely useful in industrial handling.

Furthermore, we have obtained a finding that the azeotrope or azeotrope-like composition of the invention of the present application is preferable as a foaming agent used for producing a rigid polyurethane foam or polyisocyanurate foam using isocyanate.

Fluorine-containing unsaturated hydrocarbons, such as (Z)-1-chloro-3,3,3-trifluoropropene, 2-bromo-3,3,3-trifluoropropene and (E)-2-bromo-1,3,3,3-tetrafluoropropene, which are used in the composition of the present invention, are expected to be small in GWP, since they have a double bond in the molecule. Therefore, it becomes possible to provide a material that is nonflammable and low in GWP.

In the methods of Patent Publication 7 and Patent Publication 8, perfluorobutyl alkyl ether, etc. are used. In contrast, 1,1,2,2-tetrafluoro-1-methoxyethane used in the present invention has a small number of fluorine atoms. Therefore, atom economy can also be improved. Furthermore, as compared with compounds having a perfluoroalkyl group with a long carbon chain, it has a low price and is small in long-term persistence in environment. Therefore, it is extremely useful for the uses of cleaning agent, foaming agent, etc.

Hitherto, there has not been known an azeotrope or azeotrope-like composition of 1,1,2,2-tetrafluoro-1-methoxyethane and (Z)-1-chloro-3,3,3-trifluoropropene, 2-bromo-3,3,3-trifluoropropene or (E)-2-bromo-1,3,3,3-tetrafluoropropene.

According to the present invention, there is provided an azeotrope or azeotrope-like composition containing (A) 1,1,2,2-tetrafluoro-1-methoxyethane and (B) at least one selected from the group consisting of (Z)-1-chloro-3,3,3-trifluoropropene, 2-bromo-3,3,3-trifluoropropene, and (E)-2-bromo-1,3,3,3-tetrafluoropropene.

DETAILED DESCRIPTION

Figure 1:
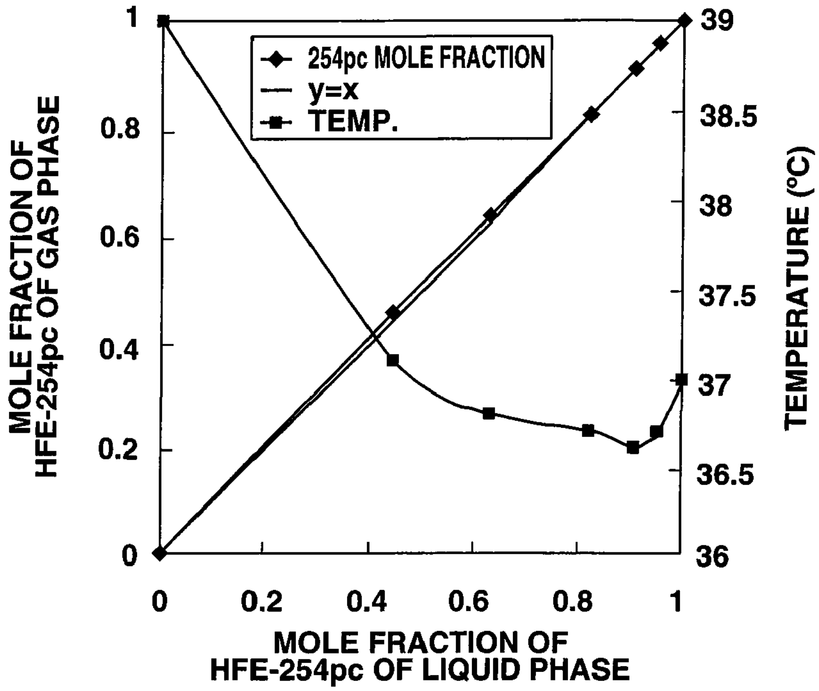
FIG. 1 shows a gas-liquid equilibrium diagram in a mixed system of HFE-254pc and OHCFC-1233c under 0.1 MPa. Mole fraction refers to molar ratio of each component of HFE-254pc and OHCFC-1233c, and temperature refers to temperature of the column top section when a heating distillation was conducted in a distillation apparatus.

According to the present invention, as compared with those owned by chlorofluorocarbon-series and chlorine-series hydrocarbons, it is possible to provide a novel composition that has superior characteristics such as cleaning property that is comparable to those or superior and low toxicity, that does not destroy the ozone layer, and that is also small in global warming potential. Furthermore, it is possible by using the composition of the present invention to provide a cleaning agent that is high in cleaning capability.

In the following, an azeotrope or azeotrope-like composition according to the present invention is described in detail.

1,1,2,2-tetrafluoro-1-methoxyethane represented by formula [1], which is used in the present invention, is a publicly known compound described in documents. For example, it can be produced by reacting tetrafluoroethylene with methanol in the presence of potassium hydroxide.

(Z)-1-chloro-3,3,3-trifluoropropene, 2-bromo-3,3,3-trifluoropropene, and (E)-2-bromo-1,3,3,3-tetrafluoropropene, which are used in the present invention, are described in the following.

It is possible to obtain (Z)-1-chloro-3,3,3-trifluoropropene together with (E)-1-chloro-3,3,3-trifluoropropene by subjecting 1,1,1,3,3-pentachloropropane to a gas-phase fluorination reaction by chromium catalyst or a liquid-phase fluorination reaction with no catalyst.

In 1-chloro-3,3,3-trifluoropropene, there exist cis form (Z form) and trans form (E form) as stereoisomers depending on the types of the substituents, but both isomers can be separated and purified by distillation.

In the present invention, as 1-chloro-3,3,3-trifluoropropene of the starting material, these stereoisomers are not particularly limited. It is possible to use either a single isomer or a mixture of respective isomers. Of these two isomers, cis form (Z form), that is, (Z)-1-chloro-3,3,3-trifluoropropene, is preferably used, since it shows a better azeotrope or azeotrope-like composition's property.

It is possible to produce 2-bromo-3,3,3-trifluoropropene by brominating trifluoropropene into 1,1,1-trifluoro-2,3-dibromopropane and then reacting this dibromo substance with potassium hydroxide.

It is possible to obtain (E)-2-bromo-1,3,3,3-tetrafluoropropene as a mixture of cis form and trans form by brominating (E/Z)-1,3,3,3-tetrafluoropropene into 1,1,1,3-tetrafluoro-2,3-dibromopropane and then reacting this dibromo substance with potassium hydroxide.

In the present invention, as 2-bromo-1,3,3,3-tetrafluoropropene of the starting material, these stereoisomers are not particularly limited. It is possible to use either a single isomer or a mixture of the respective isomers. Of these two isomers, cis form (Z form) turns rapidly and easily into trans form at room temperature at the isolation stage. Therefore, in effect, it is isolated as trans form (E form), that is, (E)-2-bromo-1,3,3,3-tetrafluoropropene. This obtained trans form can easily be purified, and (E)-2-bromo-1,3,3,3-tetrafluoropropene is preferably used in the present invention.

In the following, specific examples of the azeotrope or azeotrope-like composition according to the present invention are shown. Azeotrope composition refers to a composition in which there is no difference between composition of liquid phase and that of gas phase under a constant pressure, and which is formed of at least two substances that behave as if they were a single substance, and it is one in which there occurs no compositional change of a composition after repeated evaporation and condensation.

On the other hand, azeotrope-like composition refers to a composition in which compositional change of a composition, that is, compositional change of a composition that is formed of at least two substances, in which liquid composition and vapor composition are almost the same, and which underwent repeated evaporation and condensation, is nearly negligible. "Azeotrope-like" refers to a composition in which a mixture of at least two components does not undergo separation under a constant pressure, and in which the component ratio of liquid phase and that of gas phase are substantially close.

Azeotropy mentioned herein refers to a phenomenon in which it boils with no compositional change at a constant temperature upon distilling a solution under a constant pressure, and its boiling point refers to azeotropic point.

Next, preferable compositions of the azeotrope or azeotrope-like composition of the present invention are specifically explained.

The azeotrope or azeotrope-like composition of the present invention is formed by containing (A) 1,1,2,2-tetrafluoro-1-methoxyethane and (B) at least one selected from the group consisting of (Z)-1-chloro-3,3,3-trifluoropropene, 2-bromo-3,3,3-trifluoropropene, and (E)-2-bromo-1,3,3,3-tetrafluoropropene.

Of these, besides an azeotrope or azeotrope-like composition of the two kinds, it can be used as a mixture of the three kinds or four kinds. Preferably, they are 1,1,2,2-tetrafluoro-1-methoxyethane and (Z)-1-chloro-3,3,3-trifluoropropene, 1,1,2,2-tetrafluoro-1-methoxyethane and 2-bromo-3,3,3-trifluoropropene, and 1,1,2,2-tetrafluoro-1-methoxyethane and (E)-2-bromo-1,3,3,3-tetrafluoropropene, each of which is an azeotrope or azeotrope-like composition formed of the two kinds.

Then, regarding these, each preferable compositional ratio relative to specific azeotrope or azeotrope-like compositions is explained in the following.

(a) a case of using (Z)-1-chloro-3,3,3-trifluoropropene

By mixing 1,1,2,2-tetrafluoro-1-methoxyethane with (Z)-1-chloro-3,3,3-trifluoropropene, it is possible to obtain an azeotrope or azeotrope-like composition having a boiling point that is lower than their respective boiling points (1,1,2,2-tetrafluoro-1-methoxyethane: 37.2° C., (Z)-1-chloro-3,3,3-trifluoropropene: 38.9° C.) at the time of ordinary pressure.

For example, in this composition, it is possible to form a good azeotrope or azeotrope-like composition, when the mixing ratio of 1,1,2,2-tetrafluoro-1-methoxyethane to (Z)-1-chloro-3,3,3-trifluoropropene is normally 1-99 mol % of 1,1,2,2-tetrafluoro-1-methoxyethane and 99-1 mol % of (Z)-1-chloro-3,3,3-trifluoropropene, preferably 20-99 mol % of 1,1,2,2-tetrafluoro-1-methoxyethane and 80-1 mol % of (Z)-1-chloro-3,3,3-trifluoropropene, more preferably 40-97 mol % of 1,1,2,2-tetrafluoro-1-methoxyethane and 60-3 mol % of (Z)-1-chloro-3,3,3-trifluoropropene.

According to the present inventors, as described in the present Example 1, it is understood that a composition formed of 92.3 mol % of 1,1,2,2-tetrafluoro-1-methoxyethane and 7.7 mol % of (Z)-1-chloro-3,3,3-trifluoropropene constitutes an azeotrope composition, and its boiling point is 36.6° C. under ordinary pressure.

(b) a case of using 2-bromo-3,3,3-trifluoropropene

By mixing 1,1,2,2-tetrafluoro-1-methoxyethane with 2-bromo-3,3,3-trifluoropropene, it is possible to obtain an azeotrope or azeotrope-like composition having a boiling point that is lower than their respective boiling points (1,1,2,2-tetrafluoro-1-methoxyethane: 37.2° C., 2-bromo-3,3,3-trifluoropropene: 34.0° C.) at the time of ordinary pressure.

For example, in this composition, it is possible to form a good azeotrope or azeotrope-like composition, when the mixing ratio of 1,1,2,2-tetrafluoro-1-methoxyethane to 2-bromo-3,3,3-trifluoropropene is normally 1-99 mol % of 1,1,2,2-tetrafluoro-1-methoxyethane and 99-1 mol % of 2-bromo-3,3,3-trifluoropropene, preferably 20-95 mol % of 1,1,2,2-tetrafluoro-1-methoxyethane and 80-5 mol % of 2-bromo-3,3,3-trifluoropropene, more preferably 30-91 mol % of 1,1,2,2-tetrafluoro-1-methoxyethane and 70-9 mol % of 2-bromo-3,3,3-trifluoropropene.

According to the present inventors, as described in the present Example 2, it is understood that a composition formed of 34.2 mol % of 1,1,2,2-tetrafluoro-1-methoxyethane and 65.8 mol % of 2-bromo-3,3,3-trifluoropropene constitutes an azeotrope composition, and its boiling point is 32.6° C. under ordinary pressure.

(c) a case of using (E)-2-bromo-1,3,3,3-tetrafluoropropene

By mixing 1,1,2,2-tetrafluoro-1-methoxyethane with (E)-2-bromo-1,3,3,3-tetrafluoropropene, it is possible to obtain an azeotrope or azeotrope-like composition having a boiling point that is lower than their respective boiling points (1,1,2,2-tetrafluoro-1-methoxyethane: 37.2° C., (E)-2-bromo-1,3,3,3-tetrafluoropropene: 37.5° C.) at the time of ordinary pressure.

For example, in this composition, it is possible to form a good azeotrope or azeotrope-like composition, when the mixing ratio of 1,1,2,2-tetrafluoro-1-methoxyethane to (E)-2-bromo-1,3,3,3-tetrafluoropropene is normally 1-99 mol % of 1,1,2,2-tetrafluoro-1-methoxyethane and 99-1 mol % of (E)-2-bromo-1,3,3,3-tetrafluoropropene, preferably 30-95 mol % of 1,1,2,2-tetrafluoro-1-methoxyethane and 70-5 mol % of (E)-2-bromo-1,3,3,3-tetrafluoropropene, more preferably 40-91 mol % of 1,1,2,2-tetrafluoro-1-methoxyethane and 60-9 mol % of (E)-2-bromo-1,3,3,3-tetrafluoropropene.

According to the present inventors, as described in the present Example 3, it is understood that a composition formed of 57.8 mol % of 1,1,2,2-tetrafluoro-1-methoxyethane and 42.2 mol % of (E)-2-bromo-1,3,3,3-tetrafluoropropene constitutes an azeotrope composition, and its boiling point is 35.5° C. under ordinary pressure.

An azeotrope or azeotrope-like composition of the present invention has the same or almost the same compositions between liquid phase and gas phase during its evaporation process, and shows a high solution power. An azeotrope or azeotrope-like composition of the present invention by itself forms an azeotrope or azeotrope-like composition. Besides, it can be handled as a nonflammable or flame-retardant substance by containing (Z)-1-chloro-3,3,3-trifluoropropene, 2-bromo-3,3,3-trifluoropropene or (E)-2-bromo-1,3,3,3-tetrafluoropropene in a range of 15-99 mol % relative to 1,1,2,2-tetrafluoro-1-methoxyethane, that is, by having 70-1 mol % of 1,1,2,2-tetrafluoro-1-methoxyethane and 30-99 mol % of (Z)-1-chloro-3,3,3-trifluoropropene, or 85-1 mol % of 1,1,2,2-tetrafluoro-1-methoxyethane and 15-99 mol % of 2-bromo-3,3,3-trifluoropropene, or 85-1 mol % of 1,1,2,2-tetrafluoro-1-methoxyethane and 15-99 mol % of (E)-2-bromo-1,3,3,3-tetrafluoropropene.

For example, in the after-mentioned Referential Example, flash point was not found by having ratios of 1,1,2,2-tetrafluoro-1-methoxyethane/(Z)-1-chloro-3,3,3-trifluoropropene=70/30,1,1,2,2-tetrafluoro-1-methoxyethane/2-bromo-3,3,3-trifluoropropene=85/15, and 1,1,2,2-tetrafluoro-1-methoxyethane/(E)-2-bromo-1,3,3,3-tetrafluoropropene=85/15. Therefore, even if compared with 1,1,2,2-tetrafluoro-1-methoxyethane showing flammability by itself, it is possible to safely and easily handle them in industrial scale by having the ratios.

Then, the application of an azeotrope or azeotrope-like composition of the present invention to a cleaning agent is explained.

A composition of the present invention has a superior solubility and can widely be used for known cleaning and drying uses. In particular, it can be used as degreasing cleaning agent, flux cleaning agent, cleaning solvent or water-repellent drying agent. It is extremely useful as an alternative to CFC-113, CFC-141b and 1,1,1-trichloroethane. As its specific uses, it is possible to mention a remover of oil, grease, wax, flux, ink, etc., a cleaning agent of electronic components (printed circuit board, liquid-crystal display, magnetic recording component, semiconductor material, etc.), electric components, precision mechanical components, resin treatment components, optical lens, clothing, etc., a water-repellent drying agent, etc. It is possible to use methods that have been conventionally used, such as immersion, spraying, boiling cleaning, ultrasonic cleaning, vapor cleaning, etc. or a combination of these, etc.

As a cleaning agent of solvent, in general, the lower the boiling point is, the easier in evaporation and volatilization, and therefore it is superior in drying capability. As a result, it has a drying capability that is higher than that of each simple substance of the composition. Furthermore, in compositional ratio in azeotropic condition, the liquid phase compositional ratio and the gas phase compositional ratio at gas-liquid equilibrium become the same. Therefore, compositional change is very small even if volatilization occurs with the passage of time, and it becomes possible to obtain a constantly stable cleaning capability. Furthermore, it is possible to prevent compositional change in a storage container during storage.

Thus, in the case of using an azeotrope or azeotrope-like composition of the present invention as a cleaning agent, it can be used as a cleaning agent at the above-mentioned weight ratio.

(d) a case of using (Z)-1-chloro-3,3,3-trifluoropropene

In this case, it can be used as a cleaning agent generally in a range of 99-1 mol % 1,1,2,2-tetrafluoro-1-methoxyethane and 1-99 mol % (Z)-1-chloro-3,3,3-trifluoropropene. It is possible to form a cleaning agent that is high in cleaning capability by preferably 80-1 mol % 1,1,2,2-tetrafluoro-1-methoxyethane and 20-99 mol % (Z)-1-chloro-3,3,3-trifluoropropene, more preferably 70-1 mol % 1,1,2,2-tetrafluoro-1-methoxyethane and 30-99 mol % (Z)-1-chloro-3,3,3-trifluoropropene.

(e) a case of using 2-bromo-3,3,3-trifluoropropene

In this case, it can be used as a cleaning agent generally in a range of 99-1 mol % 1,1,2,2-tetrafluoro-1-methoxyethane and 1-99 mol % 2-bromo-3,3,3-trifluoropropene. It is possible to form a cleaning agent that is high in cleaning capability by preferably 95-1 mol % 1,1,2,2-tetrafluoro-1-methoxyethane and 5-99 mol % 2-bromo-3,3,3-trifluoropropene, more preferably 90-1 mol % 1,1,2,2-tetrafluoro-1-methoxyethane and 10-99 mol % 2-bromo-3,3,3-trifluoropropene.

(f) a case of using (E)-2-bromo-1,3,3,3-tetrafluoropropene

In this case, it can be used as a cleaning agent generally in a range of 99-1 mol % 1,1,2,2-tetrafluoro-1-methoxyethane and 1-99 mol % (E)-2-bromo-1,3,3,3-tetrafluoropropene. It is possible to form a cleaning agent that is high in cleaning capability by preferably 95-1 mol % 1,1,2,2-tetrafluoro-1-methoxyethane and 5-99 mol % (E)-2-bromo-1,3,3,3-tetrafluoropropene, more preferably 90-1 mol % 1,1,2,2-tetrafluoro-1-methoxyethane and 10-99 mol % (E)-2-bromo-1,3,3,3-tetrafluoropropene.

Herein, the present inventors can form a cleaning agent that has a characteristic of nonflammability or flame-retardancy and is high in cleaning capability by the mixing ratio as nonflammable and flame-retardant substances of the above (d), (e) and (f), that is, by making 1,1,2,2-tetrafluoro-1-methoxyethane in a range of 70-1 mol % and (Z)-1-chloro-3,3,3-trifluoropropene 30-99 mol %, 1,1,2,2-tetrafluoro-1-methoxyethane 85-1 mol % and 2-bromo-3,3,3-trifluoropropene 15-99 mol %, and 1,1,2,2-tetrafluoro-1-methoxyethane 85-1 mol % and (E)-2-bromo-1,3,3,3-tetrafluoropropene 15-99 mol %.

For example, in Example 4, it is one of preferable embodiments to use that 1,1,2,2-tetrafluoro-1-methoxyethane and (Z)-1-chloro-3,3,3-trifluoropropene are respectively 65 mol % and 35 mol % in weight ratio, that 1,1,2,2-tetrafluoro-1-methoxyethane and 2-bromo-3,3,3-trifluoropropene are respectively 80 mol % and 20 mol % in weight ratio, and that 1,1,2,2-tetrafluoro-1-methoxyethane and (E)-2-bromo-1,3,3,3-tetrafluoropropene are respectively 80 mol % and 20 mol % in weight ratio.

As a cleaning method using a cleaning agent comprising an azeotrope or azeotrope-like composition of the present invention, it is possible to mention publicly known conventional methods such as the above-mentioned immersion, spraying, boiling cleaning, ultrasonic cleaning, vapor cleaning, etc. In particular, as shown in the after-mentioned Examples, a method of removing stains by conducting immersion is particularly preferable. Immersion mentioned herein refers to that a member having a stain such as oil attached thereto is brought into contact with an azeotrope or azeotrope-like composition of the present invention. It is possible to remove the stain from the member by dissolving the stain in the composition by this method. The member mentioned herein refers to an object (an object to be cleaned) having a stain attached thereto.

It is also possible to combine another cleaning operation (boiling cleaning, ultrasonic cleaning, etc.) with the immersion operation.

In order to further improve cleaning power, interface action, etc., it is possible to add various surfactants according to need. As the surfactant, it is possible to mention nonionic surfactants, for example, Sorbitan aliphatic acid esters such as Sorbitan monooleate and Sorbitan trioleate; polyoxyethylene sorbit aliphatic acid esters such as sorbit tetraoleate of polyoxyethylene; polyethylene glycol aliphatic acid esters such as polyoxyethylene monolaurate; polyoxyethylene alkyl ethers such as polyoxyethylene lauryl ether; polyoxyethylene alkyl phenyl ethers such as polyoxyethylene nonyl phenyl ether;

polyoxyethylene alkyl amine aliphatic acid amides such as polyoxyethylene oleic acid amide; etc. They may be used singly, or a combination of at least two kinds of them may be used. For the purpose of synergistically improving cleaning power and interface action, these nonionic surfactants may be combined with cationic surfactants and anionic surfactants. Although the amount of surfactant used varies depending on its type, it is normally about 0.1-20 weight % in the composition, more preferably making it about 0.3 to 5 weight %, to the extent of no obstacle to the azeotrope-like property of the composition.

In general, in the use of refrigerant, foaming agent, cleaning agent, aerosol or water-repellent drying solvent, in the case of recovering and reusing the mixed composition after use by evaporation or distillation, it is desired that the recovered composition has a compositional change as small as possible as compared with the mixed composition before use. The mixture according to the present invention has no such compositional change or a very small one.

Upon using the composition according to the present invention under a severe condition, it is optional to further add various stabilizers. As the stabilizer, one is desirable that is distilled out therewith by distillation operation or that forms an azeotrope-like mixture. As specific examples of such stabilizer, it is possible to mention aliphatic nitro compounds such as nitromethane, nitroethane, and nitropropane; aromatic nitro compounds such as nitrobenzene, nitrotoluene, nitrostyrene, and nitroaniline; ethers such as dimethoxymethane, 1,2-dimethoxyethane, 1,4-dioxane, 1,3,5-trioxane, and tetrahydrofuran; epoxides such as glycidol, methyl glycidyl ether, allyl glycidyl ether, 1,2-butyrene oxide, phenyl glycidyl ether, cyclohexene oxide, and epichlorhydrine; unsaturated hydrocarbons such as hexene, heptene, pentadiene, cyclopentene, and cyclohexene; olefinic alcohols such as allyl alcohol and 1-butene-3-ol; acetylene-series alcohols such as 3-methyl-1-butyne-3-ol and 3-methyl-1-pentyne-3-ol; acrylates such as methyl acrylate, ethyl acrylate, butyl acrylate, and vinyl methacrylate. In order to obtain a further synergistical stabilizing effect, it can be combined with phenols, amines and benzotriazoles. These stabilizers may be used singly, or at least two kinds may be combined for use. Although the amount of the stabilizer used varies depending on the type of the stabilizer, it is to the extent of no obstacle to the azeotrope-like property of the composition. Its amount used is normally about 0.01-10 weight % in the composition, more preferably about 0.1-5 weight %.

Then, the use of an azeotrope or azeotrope-like composition in the present invention as a foaming agent is described in detail in the following.

An azeotrope or azeotrope-like composition of the present invention can be used as a foaming agent used for a rigid polyurethane foam or polyisocyanurate foam.

For producing a rigid polyurethane foam or polyisocyanurate foam, a premix composition is necessary. The premix composition is a mixture obtained by mixing together foaming agent, at least one type of polyol, catalyst, foam control agent, flame retarder, and water. It is possible to produce the target product by using the premix composition and by reacting it with isocyanate.

Foaming agent mentioned herein refers to an azeotrope or azeotrope-like composition containing 1,1,2,2-tetrafluoro-1-methoxyethane and a compound formed of at least one selected from the group consisting of (Z)-1-chloro-3,3,3-trifluoropropene, 2-bromo-3,3,3-trifluoropropene, and (E)-2-bromo-1,3,3,3-tetrafluoropropene.

Regarding composition of the foaming agent, similar to the occasion of using the cleaning agent, an azeotrope or azeotrope-like composition having a compositional ratio of the above-mentioned (d)-(f) is preferably used.

As the isocyanate, those of aromatic, cyclic aliphatic, chain-like aliphatic series, etc. are included. In general, a bifunctional one is used. As such one, it is diphenylmethane diisocyanate, polymethylene polyphenyl polyisocyanate, nathphalene diisocyanate, hexamethylene diisocyanate, isophorone diisocyanate, xylylene diisocyanate, hydrogenated xylylene diisocyanate and dicyclohexylmethane isocyanate, and prepolymer-type modified products, nurate-modified products and urea-modified products of these. These are used singly or in mixture.

As the polyol contained in the premix, it is possible to mention polyether-series polyols, polyhydric alcohols, hydroxy-containing diethylene-series polymers, etc. Polyether-series polyols are generally used. While using polyester-series polyols and polyether-series polyols as major components, it is also possible to use other polyols.

As the polyester-series polyols, it is possible to mention phthalic anhydride, waste polyester, compounds derived from castor oil, and in addition condensation-series polyester polyols, lactone-series polyester polyols, polycarbonate polyols, etc.

From the viewpoints of compatibility with foaming agent, additive, etc. and foaming property, foam property, etc., it is preferable that the polyester polyol has a hydroxy value (OH value) of 100-400 mgKOH/g and a viscosity of 200-4000 mPa·s/25° C.

As the polyether-series polyol, it is preferable to use polypropylene glycol, polytetramethylene glycol and their modified products, and in addition one obtained by using an active-hydrogen containing compound, such as sugar, polyhydric alcohol and alkanolamine, as an initiator and then by adding to this a cyclic ether, such as propylene oxide, ethylene oxide, epichlorhydrine and butyrene oxide.

As the polyether polyol, it is general to use one having a hydroxy value of 400-1000 mgKOH/g.

As the catalyst, organic metal-series catalyst and organic amine-series catalyst are included. As the organic metal-series catalyst, an organic tin compound is preferably used, and it is possible to mention stannous octoate, stannous laurate, dibutyltin dilaurate, dibutyltin dimalate, dibutyltin diacetate, dioctyltin diacetate, etc. As the organic amine-series catalyst, it is possible to mention tertiary amine, for example, triethylenediamine, N-ethylmorpholine, bis(2-dimethylaminoethyl)ether, N,N',N'-triethylethanolamine, etc.

As the foam control agent, it is general to use an organic silicon compound series surfactant. It is possible to mention SH-193, SH-195, SH-200 or SRX-253, etc. of Toray Silicone Co., Ltd., F-230, F-305, F-341, F-348, etc. of Shin-Etsu Silicone Co., Ltd., L-544, L-5310, L-5320, L-5420 and L-5720 of Nippon Unicar Co., Ltd., or TFA-420, TFA-4202, etc of Toshiba Silicone Co., Ltd.

As the flame retarder, it is a phosphate used for rigid polyurethane foam or polyisocyanurate foam. It is possible to mention tris(2-chloroethyl)phosphate, tris(2-chloropropyl)phosphate, tris(butoxyethyl)phosphate, trismethylphosphate, trisethylphosphate, triphenylphosphate, tris(isopropylphenyl)phosphate, etc.

As other additives, it is possible to mention additives for improving various properties of the rigid polyurethane foam or polyisocyanurate foam, such as ultraviolet rays protective agent, scorch protective agent and premix storage stabilizer.

Since the addition of water decreases the amount of a fluorine-series foaming agent used, it contributes to economy of the rigid polyurethane foam or polyisocyanurate foam and the reduction of vapor pressure of the premix. In the case of storing polyester-series polyol and HFE-series foaming agent in the form of premix, a fear of a partial decomposition increases. In that case, it is possible to suppress the decomposition reaction in a premix of the present invention by adding a stabilizer such as epoxy compounds such as 1,2-epoxybutane, 1,2-epoxyhexane, and epoxycyclohexane; unsaturated compounds such as α-methylstyrene, p-isopropenyltoluene, and amylene; or nitro compounds such as nitromethane, nitroethane, nitropropane, nitrotoluene, and nitrobenzene.

The proportion of using the foaming agent of the present invention is generally 5-80 parts by weight, preferably 10-70 parts by weight, more preferably 15-60 parts by weight, per 100 parts by weight of the polyol. By using the foaming agent in such amount, it is possible to obtain a rigid urethane foam having a density of 20 $kg/m^3$ or greater, particularly 30-80 $kg/m^3$.

By mixing the raw materials, they react promptly to generate reaction heat and to foam. The mixing temperature is 5-50° C., preferably 10-40° C., more preferably 15-35° C.

As a process for producing a rigid polyurethane foam or polyisocyanurate foam by using an azeotrope or azeotrope-like composition of the present invention, conventional, publicly known, various processes are included. It can be produced by one-shot process or prepolymer process. As a foaming process at the time of obtaining the foam, it is possible to use various foaming processes such as in-situ foaming, slab foaming, injection foaming (filling process, mold process), laminate foaming, and spray foaming.

An azeotrope or azeotrope-like composition of the present invention can be used for various uses such as cleaning agent, foaming agent, and in addition solvent for paint, extracting agent, heat medium such as refrigerant, or water-repellent drying solvent, etc.

Then, the present invention is specifically explained by giving examples, but the present invention is not limited by these.

EXAMPLE 1

By using a pressurized equilibrium distillation apparatus (made by Kyowa Kagaku Co., Ltd.), there were measured a gas-liquid equilibrium composition (x1 and y1) and a boiling point (t) of 1,1,2,2-tetrafluoro-1-methoxyethane (HFE-254pc) and (Z)-1-chloro-3,3,3-trifluoropropene (OHCFC-1233c; herein OHCFC is an abbreviation of Olefine HydroChloroFluoroCarbon. It shows unsaturated HCFC having an intramolecular double bond. Since these unsaturated compounds in general are large in reactivity with OH radicals in the air, they become extremely small in ozone depletion potential and GWP. Therefore, it was expressed as OHCFC in a sense to distinguish it from HCFC.). A mixed sample of a constant composition of 1,1,2,2-tetrafluoro-1-methoxyethane and (Z)-1-chloro-3,3,3-trifluoropropene was put into a sample container part, followed by heating. A stable boiling was maintained for 30 minutes or more by adjusting the heating so that the dropping rate of the gas phase condensate liquid became appropriate. After confirming that pressure and boiling point were stable, they were measured.

We determined boiling point in the heating, and compositional ratios of the gas phase component and the liquid phase component in a gas-liquid equilibrium in the sample container. The results are shown in Table 1.

TABLE 1

$CF_2HCF_2OCH_3/CF_3CH{=}CClH$ System (0.101 MPa)
Gas-Liquid Equilibrium Measurement Results

| Exp. No. | x1※1 (mol %) | y1※1 (mol %) | t (° C.) |
|---|---|---|---|
| 1 | 44.4 | 46.6 | 37.1 |
| 2 | 63.6 | 64.8 | 36.8 |
| 3 | 83.0 | 83.3 | 36.7 |
| 4 | 91.4 | 91.5 | 36.6 |
| 5 | 95.8 | 95.7 | 36.7 |

※1 $CF_2HCF_2OCH_3$ concentration in liquid phase
※2 $CF_2HCF_2OCH_3$ concentration in gas phase As shown in Table 1, the boiling point became 36.6-37.1° C. in a range of 44.4-95.8mol % of the liquid phase compositional ratio of HFE-254pc. The boiling point became lower than boiling point (37.2° C.) of HFE-254pc single component and boiling point (38.9° C.) of (Z)-1-chloro-3,3,3-trifluoropropene single component. Therefore, we could confirm that it was in an azeotrope-like condition.

Then, based on this Table 1, we made a gas-liquid equilibrium graph (X-Y line graph) in a mixed system of HFE-254pc and OHCFC-1233c with mole fraction of HFE-254pc in liquid on the horizontal axis (X axis) and with mole fraction of HFE-254pc in gas phase and the temperature in the reaction system on the vertical axis (Y axis). The results are shown in FIG. 1.

In azeotrope condition, since compositional ratio of liquid phase and compositional ratio of gas phase become the same, it becomes an azeotrope composition at the intersection of the X-Y line graph and the function Y=X. Therefore, we determined the azeotrope composition from X-Y line graph of FIG. 1. With this, 1,1,2,2-tetrafluoro-1-methoxyethane was in 92.3mol%, and (Z)-1-chloro-3,3,3-trifluoropropene was in 7.7mol %.

Its boiling point was 36.6° C. at ordinary pressure (0.101 MPa).

EXAMPLE 2

The experiment was conducted in the same manner as that of Example 1, except in that 2-bromo-3,3,3-trifluoropropene (BrTFP) was used in place of OHCFC-1233c. The results were shown in Table 2 and FIG. 2.

TABLE 2

$CF_2HCF_2OCH_3/CF_3CBr{=}CH_2$ System (0.101 MPa)
Gas-Liquid Equilibrium Measurement Results

| Exp. No. | x1※1 (mol %) | y1※1 (mol %) | t (° C.) |
|---|---|---|---|
| 1 | 30.3 | 31.1 | 32.6 |
| 2 | 40.8 | 39.7 | 32.8 |
| 3 | 61.1 | 58.3 | 33.3 |
| 4 | 80.5 | 75.0 | 34.6 |
| 5 | 90.3 | 86.4 | 35.5 |

※1 $CF_2HCF_2OCH_3$ concentration in liquid phase
※2 $CF_2HCF_2OCH_3$ concentration in gas phase From the results of Table 2, the boiling point became 32.6-35.5° C. in a range of 30.3-90.3 mol % of the liquid phase compositional ratio of HFE-254pc. The boiling point became lower than boiling point (37.2° C.) of HFE-254pc single component. Therefore, we could confirm that it was in an azeotrope-like condition.

Figure 2:
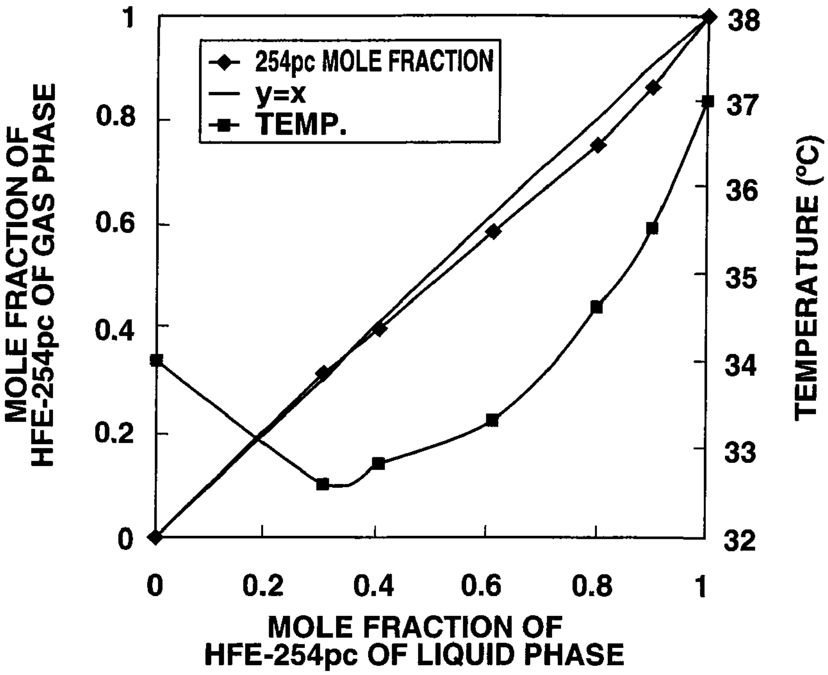
FIG. 2 shows a gas-liquid equilibrium diagram in a mixed system of HFE-254pc and BrTFP under 0.1 MPa. Mole fraction refers to molar ratio of each component of HFE-254pc and BrTFP, and temperature refers to temperature of the column top section when a heating distillation was conducted in a distillation apparatus.

We determined the azeotrope composition from X-Y line graph of FIG. 2. With this, HFE-254pc was in 34.2 mol %, and BrTFP was in 65.8 mol %.

Its boiling point was 32.6° C. at ordinary pressure (0.101 MPa).

EXAMPLE 3

The experiment was conducted in the same manner as that of Example 1, except in that (E)-2-bromo-1,3,3,3-tetrafluoropropene (BrTeFP) was used in place of OHCFC-1233c. The results were shown in Table 3 and FIG. 3.

TABLE 3

$CF_2HCF_2OCH_3/CF_3CBr{=}CFH$ System (0.101 MPa)
Gas-Liquid Equilibrium Measurement Results

| Exp. No. | x1※1 (mol %) | y1※1 (mol %) | t (° C.) |
|---|---|---|---|
| 1 | 40.7 | 42.3 | 35.6 |
| 2 | 61.1 | 60.5 | 35.5 |
| 3 | 80.4 | 78.7 | 35.8 |
| 4 | 90.6 | 89.3 | 36.1 |

※1 $CF_2HCF_2OCH_3$ concentration in liquid phase
※2 $CF_2HCF_2OCH_3$ concentration in gas phase From the results of Table 3, the boiling point became 35.5-36.1° C. in a range of 40.7-90.6 mol % of the liquid phase compositional ratio of HFE-254pc. The boiling point became lower than boiling point (37.2° C.) of HFE-254pc single component and boiling point (37.5° C.) of BrTeFP single component. Therefore, we could confirm that it was in an azeotrope-like condition.

Figure 3:
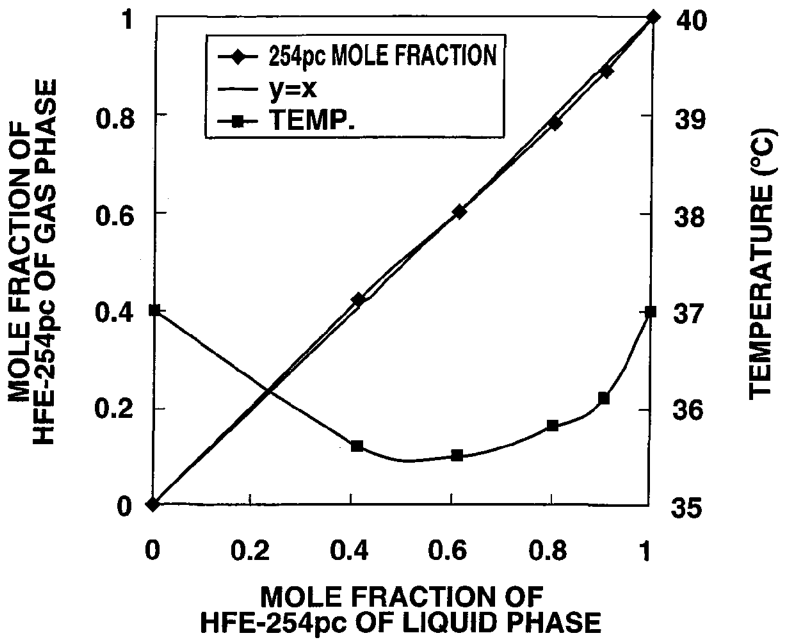
FIG. 3 shows a gas-liquid equilibrium diagram in a mixed system of HFE-254pc and BrTeFP under 0.1 MPa. Mole fraction refers to molar ratio of each component of HFE-254pc and BrTeFP, and temperature refers to temperature of the column top section when a heating distillation was conducted in a distillation apparatus.

We determined the azeotrope composition from X-Y line graph of FIG. 3. With this, HFE-254pc was in 57.8 mol %, and BrTeFP was in 42.2%. Its boiling point was 35.5° C. at ordinary pressure (0.101 MPa).

EXAMPLE 4

Cleaning Test

As cleaning agents, we selected compositions of HFE-254pc/OHCFC-1233c=50/50 (weight ratio), HFE-254pc/OHCFC-1233c=65/35 (weight ratio), HFE-254pc/BrTFP=80/20 (weight ratio), and HFE-254pc/BrTeFP=80/20 (weight ratio), conducted cleaning tests respectively, and showed the results in Table 4. As Comparative Examples, we showed the cleaning results of Vertrel XF (made by DUPONT-MITSUI FLUOROCHEMICALS COMPANY, LTD., HFC-43-10mee) and HFE-254pc alone in Table 5.

Figure 4:
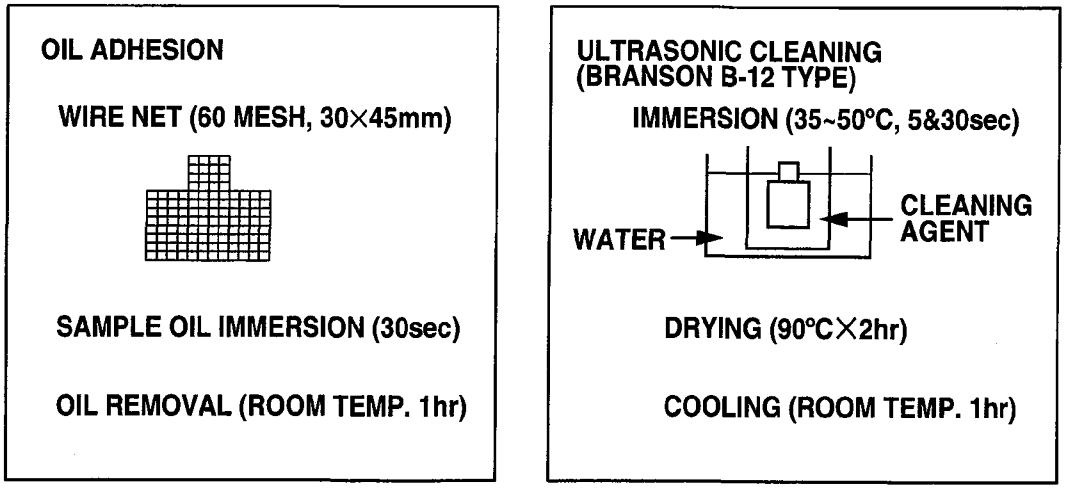
FIG. 4 shows a schematic diagram in a cleaning test of Example 4.

In the cleaning process, a 60-mesh wire net (weight; Ag) having a size shown in FIG. 4 and made of SUS was immersed in each sample oil for 30 seconds, followed by standing still at room temperature for 1 hr to remove the excessive part of the oil and then measuring the weight of the oil-attached wire net (weight; Bg). After that, it was immersed for 5 seconds and 30 seconds in 100 ml of the cleaning agent (in a beaker in an ultrasonic water tank) maintained at a predetermined temperature, followed by oil removal, then drying at 90° C. for 2 hr, then cooling and standing still at room temperature for 1 hr, then measuring the wire net weight (weight; Cg) after the oil removal, and then determining oil removal percentage from the following formula.

Oil Removal Percentage (wt %): (Bg—Cg/Bg—Ag)×100

TABLE 4

| Cleaning Agent* | Cleaning Time (sec.) | Cutting Oil Lubcut B-35 | Cutting Oil Lubcut C-80 | Spindle Oil PURESAFETY PS-10 | Hydraulic Oil Superclean SC-41 | Silicone Oil SH-193 | Removal Percentage (Average Value) (wt %) 5 sec. | Removal Percentage (Average Value) (wt %) 30 sec. |
|---|---|---|---|---|---|---|---|---|
| 254pc/1233c | 5 | 95.3 ◎ | 89.2 ○ | 95.1 ◎ | 95.8 ◎ | 99.8 ◎ | 95 | |
| (50/50) | 30 | 99.6 ◎ | 99.8 ◎ | 99.8 ◎ | 97.2 ◎ | 99.9 ◎ | | 99.3 |
| 254pc/1233c | 5 | 93.7 ○ | 82.8 ○ | 92.6 ○ | 94.4 ○ | 99.8 ◎ | 92.7 | |
| (65/35) | 30 | 99.5 ◎ | 99.8 ◎ | 99.8 ◎ | 96.1 ◎ | 99.9 ◎ | | 99 |
| 254pc/BrTFP | 5 | 74.6 □ | 65.7 □ | 89.3 ○ | 91.9 ○ | 99.4 ◎ | 84.2 | |
| (80/20) | 30 | 96.9 ◎ | 96.6 ◎ | 99.2 ◎ | 97.1 ◎ | 99.8 ◎ | | 97.9 |
| 254pc/BrTeFP | 5 | 64.2 □ | 60.8 □ | 77.2 □ | 90.6 ○ | 99.6 ◎ | 78.5 | |
| (80/20) | 30 | 90.2 ○ | 92.6 ○ | 97.6 ◎ | 94.3 ○ | 99.8 ◎ | | 94.9 |

*254pc: HFE-254pc, 1233c: OHCFC-1233c
Evaluation of Removal Percentage:
◎ 95-100 wt %;
○ 80-95 wt %;
□ 50-80 wt %;
Δ25-50 wt %;
X0-25 wt %

TABLE 5

[Comparative Example]

| Cleaning Agent* | Cleaning Time (sec.) | Cutting Oil Lubcut B-35 | Cutting Oil Lubcut C-80 | Spindle Oil PURESAFETY PS-10 | Hydraulic Oil Superclean SC-41 | Silicone Oil SH-193 | Removal Percentage (Average Value) (wt %) 5 sec. | Removal Percentage (Average Value) (wt %) 30 sec. |
|---|---|---|---|---|---|---|---|---|
| Vertrel XF | 5 | 58.4 □ | 6.1 X | 54.3 □ | 89.1 ○ | 66.8 □ | 54.9 | |
| (HFC-43-10mee) | 30 | 88.0 ○ | 37.9 Δ | 97.2 ◎ | 90.7 ○ | 72.7 □ | | 77.3 |

TABLE 5-continued

[Comparative Example]

| Cleaning Agent* | Cleaning Time (sec.) | Cutting Oil Lubcut B-35 | Cutting Oil Lubcut C-80 | Spindle Oil PURESAFETY PS-10 | Hydraulic Oil Superclean SC-41 | Silicone Oil SH-193 | Removal Percentage (Average Value) (wt %) 5 sec. | 30 sec. |
|---|---|---|---|---|---|---|---|---|
| HFE-254pc | 5 | 54.5 □ | 60.0 □ | 75.1 ○ | 87.2 ○ | 99.3 ◎ | 75.2 | |
| | 30 | 90.0 ○ | 83.4 ○ | 94.2 ○ | 92.9 ○ | 99.5 ◎ | | 92.0 |

Evaluation of Removal Percentage:
◎ 95-100 wt %;
○ 80-95 wt %;
□ 50-80 wt %;
Δ 25-50 wt %;
X 0-25 wt %

From the results of Table 4 and Table 5, it is understood that an azeotrope or azeotrope-like composition of the present invention is superior in cleaning effect (oil removal percentage) with respect to each oil as compared with the substances of Comparative Example.

EXAMPLE 5

Foaming Test

As foaming agents, we selected each composition of HFE-254pc/OHCFC-1233c =65/35 (weight ratio), HFE-254pc/BrTFP =80/20 (weight ratio), and HFE-254pc/BrTeFP =80/20 (weight ratio), and made a premix solution having a composition shown in Table 6 by using 100 parts by weight of a mixture of an ester-series Polyol A (made by TOHO RIKA CO., LTD., OH value =314mg KOH/g, viscosity =2370 mPa·s/25° C.) and an ether-series Polyol B (made by Mitsui Takeda Chemicals, OH value =755mg KOH/g, viscosity =45000 mPa·s/25° C.). After stirring and mixing 5g of this premix and 9.4g of an isocyanate (Cosmonate M-200 made by Mitsui Takeda Chemicals) at room temperature, reactivity was measured. The results were shown in Table 7. As Comparative Example, a case of using HFE-254pc alone as the foaming agent was also shown in Table 7. Table 7 shows weight ratio, gelation time, and external appearance of the foam.

TABLE 6

| Composition | Parts by Weight |
|---|---|
| Polyol A | 70 |
| Polyol B | 30 |
| SH-193 (made by Dow Corning Toray: Foam Control Agent) | 1 |
| TCPP*[1] (Flame Retarder) | 15 |
| Potassium Acetate | 2 |
| PC-41 (made by Air Products: Catalyst) | 2 |
| Water | 2 |
| Foaming Agent*[2] | 50 |

*[1]TCPP: tris(2-chloropropyl)phosphate
*[2]Foaming Agent: HFE-254pc/OHCFC-1233c, HFE-254pc/BrTFP, HFE-254pc/BrTeFP

TABLE 7

| Foaming Agent*[1] | Weight Ratio | Gelation Time*[2](s) | Foam Appearance*[3] |
|---|---|---|---|
| 254pc (Comp. Ex.) | 100 | 20 | ○ |
| 254pc/1233c | 65/35 | 19 | ◎ |
| 254pc/BrTFP | 80/20 | 19 | ◎ |
| 254pc/BrTeFP | 80/20 | 19 | ◎ |

*[1]254pc: HFE-254pc, 1233c: OHCFC-1233c
*[2]Gelation time refers to the period of time, from the point at which cure has started to conduct cure, to the point at which gel is formed.
*[3]Foam Appearance (◎: very good, ○: good, Δ: somewhat inferior, X: inferior).

From the results of Table 7, it is understood that foaming by an azeotrope or azeotrope-like composition of the present invention is high in reactivity and very good in foam external appearance and is very excellent as a foaming agent, as compared with the case in which foaming is conducted by HFE-254pc alone.

REFERENTIAL EXAMPLE

Flash point measurement (tag closed-type flash point measuring instrument) of each composition was conducted. As a result, no flash point was found at 70/30 (weight ratio) of 1,1,2,2-tetrafluoro-1-methoxyethane/(Z)-1-chloro-3,3,3-trifluoropropene (HFE-254pc/OHCFC-1233c), at 85/15 (weight ratio) of 1,1,2,2-tetrafluoro-1-methoxyethane/2-bromo-3,3,3-trifluoropropene (HFE-254pc/BrTFP), and at 85/15 (weight ratio) of 1,1,2,2-tetrafluoro-1-methoxyethane/(E)-2-bromo-1,3,3,3-tetrafluoropropene (HFE-254pc/BrTeFP).

The invention claimed is:

1. An azeotrope or azeotrope-like composition comprising:
(A) 1,1,2,2-tetrafluoro-1-methoxyethane; and
(B) at least one compound selected from the group consisting of (Z)-1-chloro-3,3,3-trifluoropropene, 2-bromo-3,3,3-trifluoropropene, and (E)-2-bromo-1,3,3,3-tetrafluoropropene.

2. An azeotrope or azeotrope-like composition according to claim 1, which comprises 20-99 mol % of 1,1,2,2-tetrafluoro-1-methoxyethane and 80-1 mol % of (Z)-1-chloro-3,3,3-trifluoropropene.

3. An azeotrope or azeotrope-like composition according to claim 1, which comprises 20-95 mol % of 1,1,2,2-tetrafluoro-1-methoxyethane and 80-5 mol % of 2-bromo-3,3,3-trifluoropropene.

4. An azeotrope or azeotrope-like composition according to claim 1, which comprises 30-95mol % of 1,1,2,2-tetrafluoro-1-methoxyethane and 70-5 mol % of (E)-2-bromo-1,3,3,3-tetrafluoropropene.

5. A cleaning agent comprising an azeotrope or azeotrope-like composition according to claim 1.

6. A foaming agent comprising an azeotrope or azeotrope-like composition according to claim 1.

7. A cleaning method comprising the step of bringing an azeotrope or azeotrope-like composition according to claim 1 into contact with a member having a stain attached thereto, thereby cleaning the member.

8. A method for producing a rigid polyurethane foam or polyisocyanurate, comprising mixing an azeotrope or azeotrope-like composition according to claim 1, a polyol compound, a catalyst, a foam control agent, a flame retarder, and an additive to form a premix; and reacting the premix with an isocyanate.

* * * * *